July 10, 1962

T. L. C. VAN GEEL ETAL 3,043,979

ELECTROLUMINESCENT ELEMENT

Filed Dec. 9, 1959

INVENTORS
T.L.C. VAN GEEL
H.J.M. JOORMAN
BY
AGENT

United States Patent Office 3,043,979
Patented July 10, 1962

3,043,979
ELECTROLUMINESCENT ELEMENT
Theodorus Leonardus Cornelis van Geel and Hendrik Jacobus Maria Joormann, both of Eindhoven, Netherlands, assignors to North American Philips Company, Inc., New York, N.Y., a corporation of Delaware
Filed Dec. 9, 1959, Ser. No. 858,362
Claims priority, application Netherlands Dec. 17, 1958
6 Claims. (Cl. 313—108)

This invention relates to electroluminescent cells or elements, that is to say elements comprising a layer of electroluminescent material which is provided between two conductive layers serving as electrodes.

Elements of the above type have been known for a couple of years already and have been used as light sources, for example for purposes of decoration or indication. The electroluminescent layer of such elements in most of the cases consists of a powdery electroluminescent material, embedded in a medium having a high dielectric constant, for example a synthetic resin. When between the electrodes, provided on either side of this electroluminescent layer, an alternating voltage of sufficient value is set up, the electroluminescent material luminesces. Naturally the emission is dependent on the nature of the electroluminescent material. These materials are practically invariably zinc sulphide, cadmium sulphide or zinc cadmium sulphide each activated with some activator or other. An unpleasant property of the electroluminescent material in general and of the above sulphides in particular, is that they are highly sensitive to moisture. The action of moisture on the electroluminescent layer results in a strong decrease of the output, after a comparatively short period of time. This phenomenon was already ascertained some time ago and various measures have been taken to prevent it. One of the best known measures is that the electroluminescent material is enclosed in a sealing agent, for which several materials were suggested, inter alia synthetic resins. In order to obtain a sufficient amount of light from the elements, it is naturally undesirable to enclose the elements entirely. Therefore, the elements have been built up as follows. On a transparent carrier body, that is to say permeable to the radiation produced in the element, for example quartz, glass or synthetic resin, a conductive layer is provided which is likewise transparent. On this layer which is very thin, the electroluminescent layer is then provided which, on the other side, is covered with the second electrode. This electrode may be opaque in which case one has an element which can radiate to one side only, which, in general, is sufficient. This latter metal layer can be applied in a simple manner, for example by providing a metal, for example aluminum, by spraying or evaporating. In order to increase the output in the direction of radiation, it has also been suggested already to apply a thin layer of titanium dioxide between the latter metal layer and the electroluminescent layer. This layer at the same time increases the break-down voltage of the element.

In an element built-up in this manner, the moisture-repellent sealing agent is applied both on the sides and on the rear-side.

At any rate care should be taken that, starting from any point of the electroluminescent layer, the minimum length of the path through the envelope of the element outwards omnidirectionally is so large that the influence of the moisture of the atmosphere remains below that value at which decrease of the electroluminescence may occur. At the periphery of the electroluminescent layer, the sealing layer must consequently extend in line with the electroluminescent layer so far that this length of path is available. As a result of this, the total size of the element in this direction is increased. With large elements this increase of the size naturally plays a smaller part than in the case of small elements. For, with these small elements, the increase, in percentage, is much more considerable than with elements having a large surface. Also in the direction in which the radiation is to be emitted, the length of path through the sealing layer should meet the minimum length, as a result of which the element becomes thicker. The carrier may then be chosen thicker, as a result of which a greater absorption of the emitted radiation will naturally occur, or the sealing layer may be partially provided on the front side of the carrier. In this case, however, even more of the useful radiation surface will be lost.

An electroluminescent element according to the invention is built up in such a manner that the above drawbacks occur to considerably lesser degree.

An electroluminescent element according to the invention comprises an electroluminescent layer having on either side an electrode, of which at least one is transparent, and an envelope partially consisting of a moisture-repellent sealing agent and partially of a material which, when of equal thickness, is less permeable to moisture than the sealing agent, and is characterized in that the part of the envelope not consisting of sealing agent has the shape of a container comprising the electroluminescent layer and the electrode, and that the sealing agent is applied in the container in a manner such that the minimum length of path from any point of the electroluminescent layer outwards via the sealing agent is larger than the smallest thickness of the part of the envelope not consisting of sealing agent.

Preferably the minimum length of path from any point of the electroluminescent layer outwards is at least three times as large as the smallest thickness of the part of the envelope not consisting of sealing agent.

Here, as well as in the already known form of an electroluminescent element, the sealing agent should meet various requirements. Naturally, low moisture permeability is very important. In addition, the sealing agent should adhere well to the part not consisting of sealing agent, it should be easy of deformation, be radiation-resistant, that is to say retain its good properties also during use when it is subjected to the radiation of the electroluminescent layer, and be inert with respect to the electroluminescent material and the electrodes. Quite a series of materials have been tested as to these properties and it has been found that ethoxylenic resins, particularly the cast resins, give good satisfaction. In addition, it is also possible to use polyesters, whether modified or not, combinations of natural and synthetic resins, or phenylic resins. All these materials are moisture tight, it is true, but only if they are applied in a comparatively thick layer, in general exceeding 5 mm. This minimum thickness is an absolute measure, which is entirely independent of the size of the electroluminescent element. As already stated above, the sizes of the known elements are increased by this minimum thickness, in a plane parallel to the electroluminescent layer. So, if, for example, one has an element of, say, 1 cm. diameter, which is to be used for a round push-button, this element is increased by 5 mm. omnidirectionally. The total diameter consequently becomes 2 cm. of which only one half emits radiation.

So, for the container-like part of the electroluminescent element according to the invention, materials should be used which are less permeable to moisture than the sealing agents. Suitable materials are, for example, glass and quartz. In general, the thickness of these materials may be considerably smaller than the minimum thickness of the sealing agent because they are considerably better moisture-tight. At any rate, an improvement is already obtained, when they are better than the sealing agents and in that case it is consequently sufficient that the minimum length of path from any point of the luminescent layer outwards is larger than the smallest thickness of the part of the envelope not consisting of sealing agent.

In order that the invention may be readily carried into effect, it will now be described in greater detail with reference to the accompanying drawing, in which.

Figure 1:
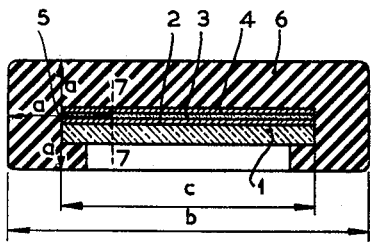
FIGURE 1 shows one embodiment of a known element to illustrate the principle underlying the invention.

In FIGURE 1, the carrier, for example of glass, of the electroluminescent element is indicated by 1. This carrier has a transparent electrode 2, for example conductive stannic oxide. The electroluminescent layer with the binding agent is indicated by 3 and the second electrode, whether or not transparent, by 4. In order to exclude the electroluminescent layer from the atmosphere, it has been suggested to envelop the element with a layer of sealing agent 6. This layer should have such a form and thickness that, starting from a point 5 at the periphery, the minimally permissible, that is to say, sufficiently closing thickness, in this case equalling $a$, has to be traversed to all sides where the atmosphere can be reached via the sealing agent 6. In the figure the various directions $a$ are plotted. Starting from point 5 downwards and round the corner of the glass plate 1, naturally also the distance to the atmosphere should be at least equal to $a$. The result of this minimum requirement is that the total width $b$ equals the width $c$ of the actual radiating element plus $2a$. If, in addition, the sealing layer extends also at the front of the element, a part of the surface having the diameter $c$ becomes less permeable to the emitted radiation. This can naturally be met by giving the carrier 1 the thickness $a$. In that case, however, a great absorption of the emitted radiation in the carrier 1 is the result.

The thickness $a$ is also required at the back of the element, since the electrode 4 does not close the layer 3 in a sufficiently moisture-tight manner. However, in this direction a large thickness is mostly little disturbing.

Another possibility to meet the requirement of separating the edge of the electroluminescent layer 4 from the atmosphere by a thickness of the sealing agent at least equalling $a$ in line with the plane of the electroluminescent layer 3 consists therein that the electroluminescent layer 3 does not extend any further than the line 7—7, which is at a distance $a$ from the edge of the element. Also in this case, however, the active surface of the element is considerably smaller than the total surface of the element.

Figure 2:
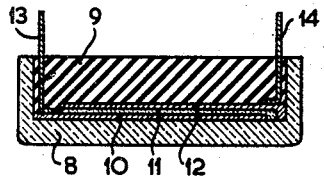
FIGURES 2 to 6 show embodiments of an electroluminescent element according to the invention.

FIGURE 2 shows an embodiment of an element according to the invention in which 8 indicates a container-shaped part consisting of a material which, when of equal thickness, is less permeable to moisture than the sealing agent in the container at 9. In this embodiment the conductive transparent layer 10, for example consisting of conductive stannic oxide, the electroluminescent layer 11 and the electrode 12, are carried by the container 8. The radiation of this element may be to one side or two sides. Dependent on this, at least the bottom of the container 8 or the sealing agent 9 must consequently be permeable to the radiation. If the radiation is to be emitted to the back-side, the electrode 12 must, naturally, be transparent and the electrode 10 may be opaque. Preferably, however, the radiation will be emitted through the bottom of the container 8, since it may be considerably thinner than the thickness of the layer 9. Current supply wires for the electrodes 10 and 12 are indicated by 13 and 14. They are embedded in a layer of sealing agent 9. It has appeared of advantage to use flexible strips for these current supply conductors, for than a better and more resistant connection of the sealing agent 9 thereto is achieved.

In a specific embodiment of the element shown in FIGURE 2 the round glass container 8 has an outer diameter of 30 mms., an inner diameter of 28 mms. and a thickness of 1 mm. The conductive layer 10 consists of stannic oxide and the conductive layer 12 of silver-powder-paint. The electroluminescent layer 11 consists of ZnS activated with Cu with urea resin as binding agent. The sealing agent 9 consisting of aethoxylene resin has a thickness of 5 mms.

It is clear from FIGURE 2 that the total width of the element with the envelope for the same useful surface as shown in FIGURE 1 is considerably smaller than the dimension $b$ in FIGURE 1. The dimensions in FIGURE 2 have not all of them been enlarged equally strongly, since the layers 10, 11 and 12 are very thin and have, for clearness' sake, been enlarged far more strongly than the thickness of the parts 8 and 9. At any rate it goes forward from FIGURE 2 that the minimum length of path from any point of the electroluminescent layer outwards via the sealing agent 9 is larger than the smallest thickness of the container-shaped body 8, namely approximately 4 times as large.

Figure 3:
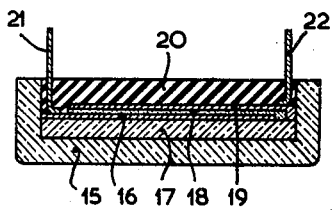

In the embodiment shown in FIGURE 3, an additional carrier 17, for example of the same material as the container 15, is provided between the container-shaped body 15 and the first electrode 16. The electrode 16, the electroluminescent layer 18, and the second electrode 19 are applied to the carrier before the whole of the parts 16 to 19 is positioned in the container 15. It is as a matter of fact simpler to provide the electrodes and the electroluminescent material on a flat surface than on the bottom of the container 15. After the whole of the parts 16 to 19 has been made, it is placed in the container 15 and the sealing agent 20 is provided. Flexible-strip-like current supply conductors are indicated by 21 and 22.

Figure 4:
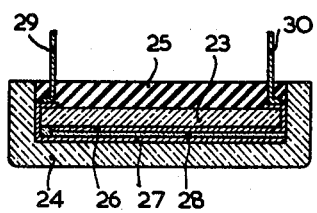

The embodiment according to FIGURE 4 shows great resemblance to the embodiment shown in FIGURE 3. The additional carrier 23, however, is not provided on the side of the bottom of the container 24, but on the side remote therefrom. The sealing agent is indicated by 25, the electrodes by 26 and 27 respectively, the electroluminescent layer by 28, and the current supply conductors by 29 and 30 respectively.

Figure 5:
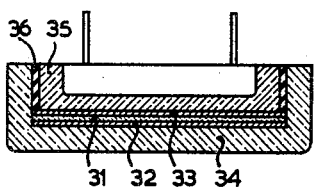
Figure 6:
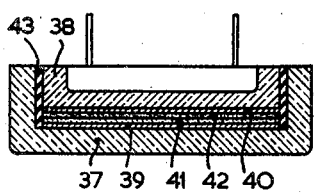

FIGURE 5 shows a form in which the electroluminescent layer 31 and the electrodes 32 and 33, provided on either side of the layer 31, are provided between the inside of the bottom of the container-shaped body 34 and the outside of the bottom of a second container-shaped body 35, preferably consisting of the same material as the container 34. The aperture 36 between the two parts 34 and 35 is filled with the sealing agent. The height of this aperture 36 exceeds the minimum thickness of the container 34. In this embodiment an even better moisture-tight closure is achieved than in the embodiment shown in FIGURES 2, 3 and 4. If desired, a disc of a thickness equal to the height of the aperture 36 may be used instead of the container-shaped part 35. However, if the element is to emit radiation to either side, the embodiment shown in FIGURE 5 is of advantage. FIGURE 6 shows an embodiment of an electroluminescent element according to the invention which shows great resemblance to that of FIGURE 5. However, in the manufacture the whole of electrodes and electroluminescent layer is not built up, as shown in FIGURE 5, on the inside of the bottom of the outer container, but on the outer side of the bottom of the inner container. In this figure, the outer container is indicated by 37, the inner container by 38, the electrodes by 39 and 40 respectively, and the electroluminescent layer by 41. Between the electrode 40 and the electroluminescent layer 41 is a layer 42, which well reflects the radiation emitted by the electroluminescent layer. For visible radiation, this layer consists, for example, of titanium-dioxide. In this embodiment the radiation is emitted through the bottom of the container 37 and the electrode 39 must consequently be transparent. The aperture 43 between the two parts 37 and 38 is closed by the sealing agent.

As sealing agents the already known materials may be used. If necessary, a softening agent may be added to these materials to avoid tension being exerted on the container-shaped elements. In fact some of the known sealing agents expand on cooling or polymerisation.

In special cases, only the bottom of the container-shaped parts could be made transparent to the radiation. The upright edges could then consist, for example, of metal which is melted to the bottoms or connected in some other way in an entirely moisture-tight manner.

What is claimed is:

1. An electroluminescent element comprising a cup-shaped supporting glass container having bottom wall and upwardly extending wall portions, a layer of moisture-sensitive electroluminescent material mounted within said container and extending generally parallel to the said bottom wall portion, electrodes contacting opposite sides of the electroluminescent layer, one of said electrodes being transparent flexible conductive leads connected to electrodes, and a moisture-impervious body of a sealing agent secured to the container wall portions and sealing the electroluminescent layer within the container and surrounding the conductive leads, said sealing agent having a thickness sufficiently large to prevent external moisture from reaching the electroluminescent layer and at which the minimum length of path from any point of the electroluminescent layer via the sealing agent to the outside is larger than the smallest thickness of a container wall portion, said container being moisture-impervious and being constituted of a material whose comparative moisture imperviousness for a given thickness is substantially greater than a comparable thickness of the sealing agent.

2. An electroluminescent element comprising a cup-shaped container having a transparent bottom wall and upwardly extending wall portions, a layer of moisture-sensitive sulphide-type electroluminescent material mounted within said container and extending generally parallel to the said bottom wall portion, electrodes contacting opposite sides of the electroluminescent layer, the electrode adjacent the bottom wall being transparent, and a moisture-impervious body of a sealing agent secured to the container wall portions and sealing the electroluminescent layer within the container, said sealing agent having a thickness sufficiently large to prevent external moisture from reaching the electroluminescent layer and at which the minimum length of path from any point of the electroluminescent layer via the sealing agent to the outside is at least three times larger than the smallest thickness of a container wall portion, said container being moisture-impervious and being constituted of a material whose comparative moisture-imperviousness for a given thickness is substantially greater than a comparable thickness of the sealing agent.

3. An element as set forth in claim 2 wherein the cup-shaped container is constituted of a material selected from the group consisting of glass and quartz, and the sealing agent is a synthetic resin.

4. An electroluminescent element comprising a cup-shaped glass container having a bottom wall and upwardly extending wall portions, a transparent electrode on the inside bottom wall, a layer of moisture-sensitive electroluminescent sulphide material mounted within said container over the transparent electrode, another electrode contacting the opposite side of the electroluminescent layer, and a moisture-impervious body of an in situ cast synthetic resin secured to the container wall portions and completely filling the remainder of the container and sealing the electroluminescent layer within the container, said resin having a thickness sufficiently large to prevent external moisture from reaching the electroluminescent layer and at which the minimum length of path from any point of the electroluminescent layer via the resin to the outside is much larger than the smallest thickness of a container wall portion, said container being moisture impervious and the glass of which it is constituted having a comparative moisture-imperviousness for a given thickness substantially greater than a comparable thickness of the resin.

5. An electroluminescent element comprising a cup-shaped glass container having bottom wall and upwardly extending wall portions, a glass support, an electrode on said support, a layer of moisture-sensitive electroluminescent material on said support over said electrode, said support being mounted within said container and extending generally parallel to the said bottom wall portion, another electrode contacting the opposite side of the electroluminescent layer, one of said electrodes being transparent, and a moisture-impervious body of an in situ cast synthetic resin secured to the container wall portions and completely filling the remainder of the container and sealing the electroluminescent layer within the container, said resin having a thickness sufficiently large to prevent external moisture from reaching the electroluminescent layer and at which the minimum length of path from any point of the electroluminescent layer via the resin to the outside is much larger than the smallest thickness of a container wall portion, said container being moisture-impervious and the glass of which it is constituted having a comparative moisture-imperviousness for a given thickness substantially greater than a comparable thickness of the resin.

6. An electroluminescent element comprising a first cup-shaped container having bottom wall and upwardly extending wall portions, a second, smaller cup-shaped container nested within the first container but spaced from the latter, a layer of moisture-sensitive electroluminescent material mounted between said nested containers and extending generally parallel to the said bottom wall portion, electrodes contacting opposite sides of the electroluminescent layer, one of said electrodes being transparent, and a moisture-impervious body of a resin secured to and between both containers and sealing the electroluminescent layer between the nested containers, said resin having a thickness sufficiently large to prevent external moisture from reaching the electroluminescent layer and at which the minimum length of path from any point of the electroluminescent layer via the resin to the outside is much larger than the smallest thickness of a container wall portion, each of said containers being moisture-impervious and being constituted of a material whose comparative-imperviousness for a given thickness is substantially greater than a comparable thickness of the resin.

References Cited in the file of this patent

UNITED STATES PATENTS

| | | |
|---|---|---|
| 2,183,256 | Gabler | Dec. 12, 1939 |
| 2,222,788 | Touceda et al. | Nov. 26, 1940 |
| 2,774,004 | Jaffe | Dec. 11, 1956 |
| 2,863,061 | Destriau | Dec. 2, 1958 |

FOREIGN PATENTS

| | | |
|---|---|---|
| 740,473 | Great Britain | Nov. 16, 1955 |
| 798,504 | Great Britain | July 23, 1958 |

UNITED STATES PATENT OFFICE
CERTIFICATE OF CORRECTION

Patent No. 3,043,979

July 10, 1962

Theodorus Leonardus Cornelis van Geel et al.

It is hereby certified that error appears in the above numbered patent requiring correction and that the said Letters Patent should read as corrected below.

Column 3, line 31, before "the" insert -- as shown, --; column 5, line 17, after "to" insert -- the --.

Signed and sealed this 26th day of March 1963.

(SEAL)
Attest:

ESTON G. JOHNSON
Attesting Officer

DAVID L. LADD
Commissioner of Patents